United States Patent [19]
Brandt

[11] 3,797,684
[45] Mar. 19, 1974

[54] TRANSPORTING AND DUMPING APPARATUS

[76] Inventor: Vernon J. Brandt, 5712 Ave. 430, Reedley, Calif. 93654

[22] Filed: May 2, 1972

[21] Appl. No.: 249,563

[52] U.S. Cl. .................. 214/313, 214/620, 214/654
[51] Int. Cl. ............................................ B65g 65/00
[58] Field of Search ............ 214/55, 312, 313, 314, 214/620, 652, 750

[56] References Cited
UNITED STATES PATENTS
| | | | |
|---|---|---|---|
| 3,206,052 | 9/1965 | Kennedy | 214/652 |
| 3,438,523 | 4/1969 | Vik | 214/313 |
| 1,793,622 | 2/1931 | Kidder | 214/47 |

Primary Examiner—Gerald M. Forlenza
Assistant Examiner—Lawrence J. Oresky
Attorney, Agent, or Firm—Lyon & Lyon

[57] ABSTRACT

An apparatus for handling large bin containers includes a frame assembly adapted to be fixably mounted on a vehicle and a bin carrying assembly pivotally attached to the frame assembly for movement between a bin transporting position and a bin dumping position. The bin carrying assembly is provided with forks for supporting a bin thereon and movable clamping arms to secure a bin thereto. A lock assembly locks the movable elements of the apparatus in various fixed arrangements to insure proper operation of the apparatus.

15 Claims, 12 Drawing Figures

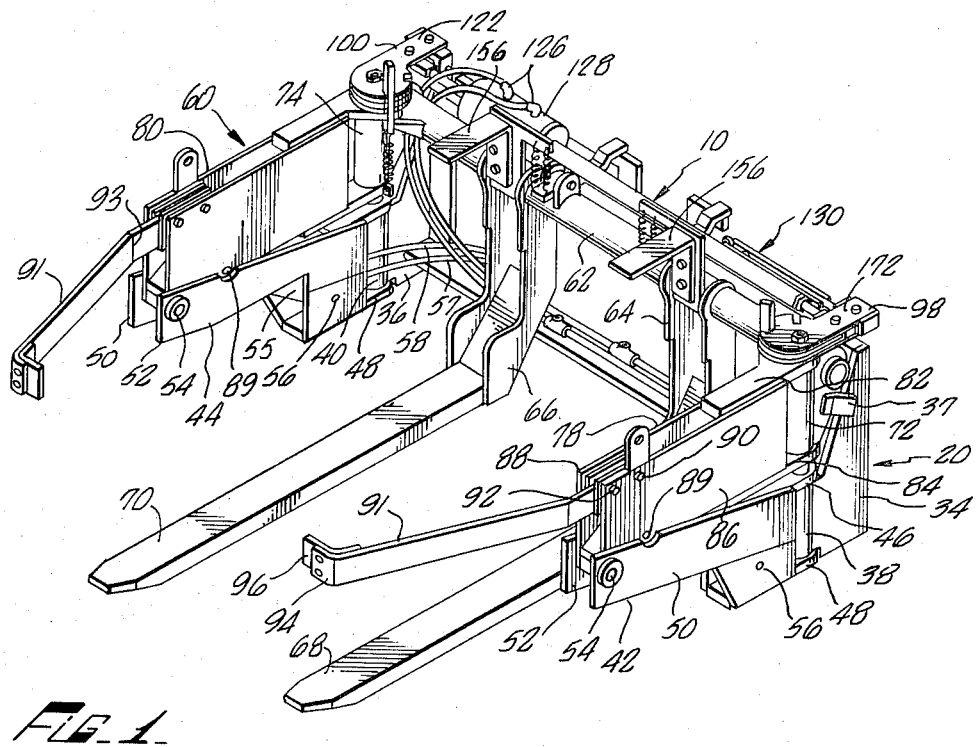
FIG_1.
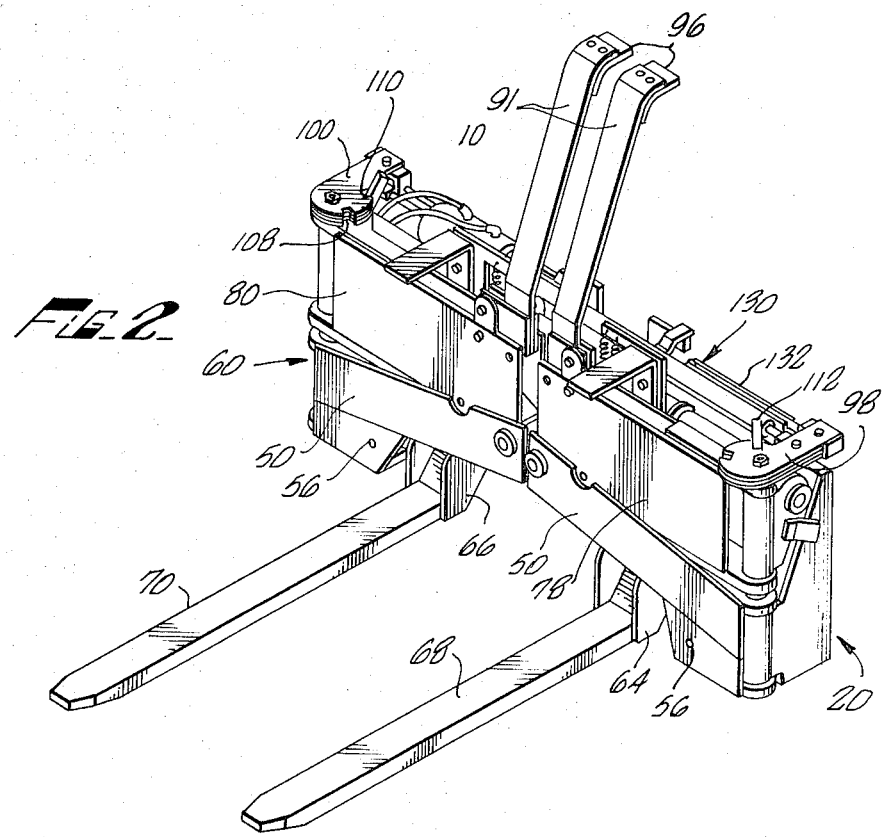
FIG_2.

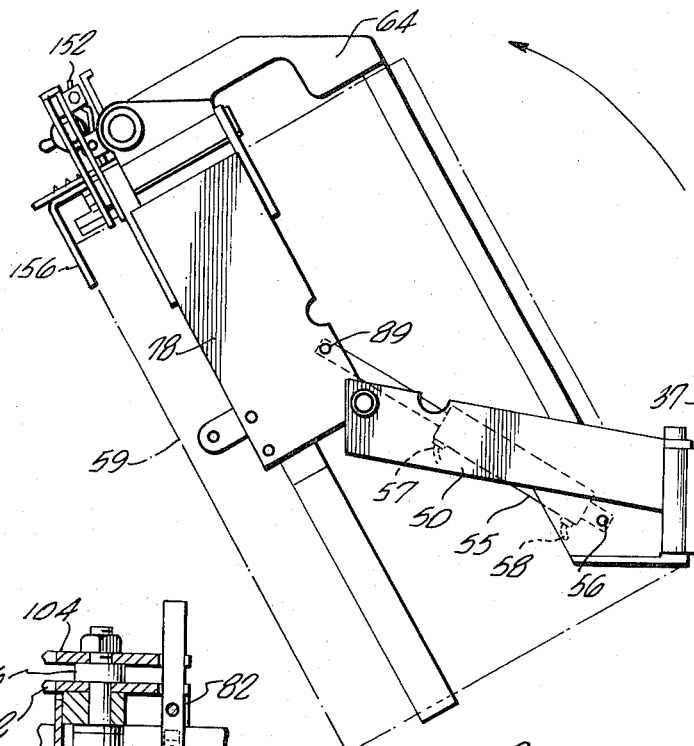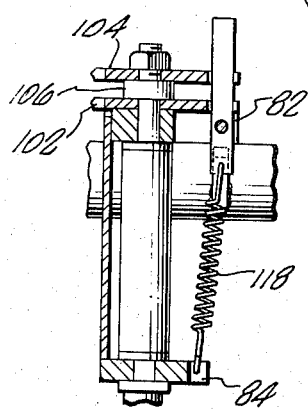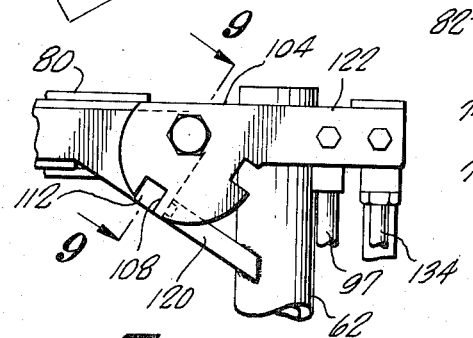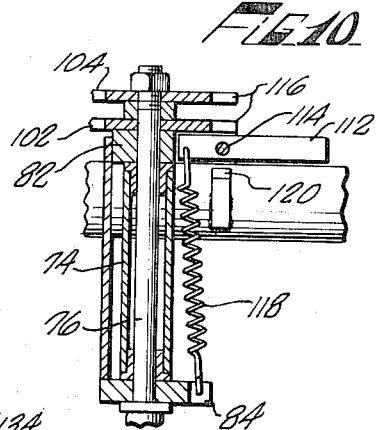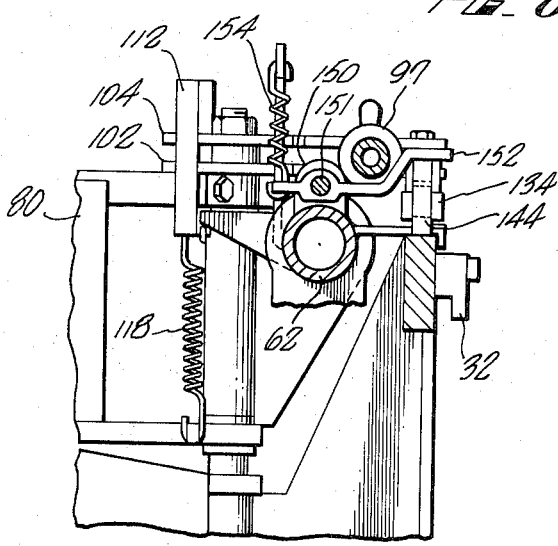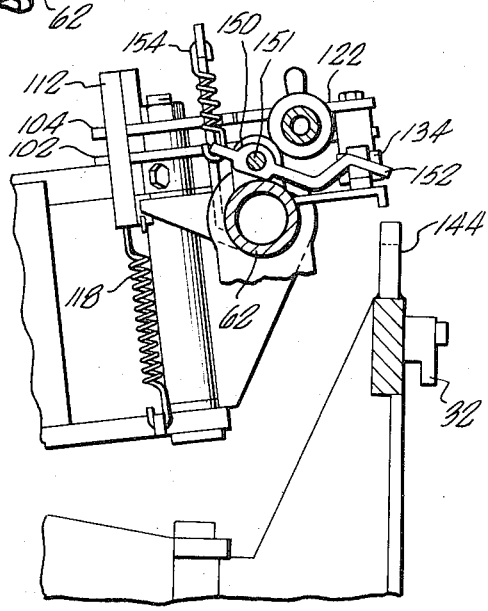

TRANSPORTING AND DUMPING APPARATUS

This invention relates to an apparatus for transporting bin containers and dumping the contents therein and more particularly relates to a transporting and dumping apparatus with an improved lock assembly to insure proper operation of the apparatus.

Large bin containers, such as those provided for harvested fruit or vegetables, when filled are heavy and typically require a fork lift or similar equipment for transportation. Moreover, because of the weight and size of these bin containers, mechanical equipment is also required for dumping the harvested produce or other contents within the bin containers after they have been transported to the proper location.

In order to save time and eliminate additional handling procedures, it is desirable to provide a single apparatus which is capable of transporting a bin in an upright position and then adjusting the position of the bin thereon for dumping the bin contents. Such a combination apparatus must be capable of securely supporting and maintaining one of these relatively heavy bin containers in the one position during transportation and in the other position during dumping, and during the change in the position of the bin. Therefore, it is a primary object of the present invention to provide an apparatus for transporting a bin container and dumping the contents therein, with a lock assembly which will positively lock the movable mechanical elements of the apparatus in various predetermined arrangements to insure proper support of a bin thereon during the entire operation of the apparatus. In this regard, it is important to note that even an inadvertent partial release of the bin could result in an accidental dumping of the contents therein and that an inadvertent complete release of the bin during operation of the apparatus would not only result in an undesirable dumping of the contents within the bin, but because of the size and weight of such a bin could be very hazardous to personnel nearby. The lock assembly minimizes the possibility of such accidents.

In addition, it is desirable to provide a transporting-dumping apparatus which is substantially automated. However, such an apparatus requires a rather sophisticated arrangement of parts including several movable components. In order for the automated apparatus to perform properly, it is necessary that the movable components operate in a proper sequence. Therefore, it is still another object of this invention to provide an automated transporting and dumping apparatus with a lock assembly which will prevent movement of certain components and permit movement of certain other components in a proper sequence during the operation of the apparatus.

In accordance with these objects, the present invention briefly comprises a frame assembly adapted to be fixably mounted on a bin transporting vehicle, a bin carrying assembly connected to the frame assembly and movable with respect thereto between a bin transporting position and a bin dumping position, and a lock assembly adapted to lock the movable components or elements of the apparatus in the proper positions relative to each other for each of the operational steps performed by the apparatus. The bin carrying assembly includes bin supporting forks which are movable about a horizontal axis in order to shift a bin thereof from an upright transporting position to an inverted dumping position and movable clamping arms for securing the bin during both the transportation and dumping thereof. Power means are provided for moving the bin carrying assembly and the forks thereof about the horizontal axis and for moving the clamping arms between an open position and a clamping position. The lock assembly includes one or more movable lock elements which are operably connected to the clamping arms and which operate in association therewith.

Since the forks of the apparatus can be used in connection with the vehicle for other operations besides transporting these container bins and dumping the contents therein, it is still another object of this invention to provide an apparatus of the type described above which is partially collapsible to move certain elements of the apparatus to an inoperative position which will not interfere with other independent operations of the forks and the vehicle.

Still another object of the present invention is to provide an apparatus for handling bin containers which is simple to operate and which is provided with control means to prevent improper operation of the apparatus.

Other and further objects and advantages of this invention will be made readily apparent from the following detailed description and accompanying drawings, wherein:

FIG. 1 is a perspective view of the apparatus illustrating the bin carrying assembly in a bin transporting position;

FIG. 2 is a perspective view of the apparatus illustrating an inoperative position of certain elements of the apparatus which thereby permits other uses of the forks;

FIG. 7 is a side view of the apparatus illustrating the dumping position of the bin carrying assembly;

FIG. 8 is a fragmentary top view of the apparatus illustrating the operative connection between a movable lock element of the lock assembly and a clamping arm;

FIG. 9 is a fragmentary side view of the apparatus taken substantially on the lines 9—9 of FIG. 8 illustrating the connection of a clamping arm to the bin carrying assembly;

FIG. 10 is a fragmentary side view partly in section similar to FIG. 9 which further illustrates the connection of a clamping arm to the bin carrying assembly;

FIG. 11 is a fragmentary side sectional view taken substantially on the lines 11—11 of FIG. 3 illustrating the lock assembly when the bin carrying assembly is in a transporting position; and FIG. 12 is a fragmentary side sectional view similar to FIG. 11 illustrating the lock assembly during movement of the bin carrying assembly to a dumping position.

Figure 3:
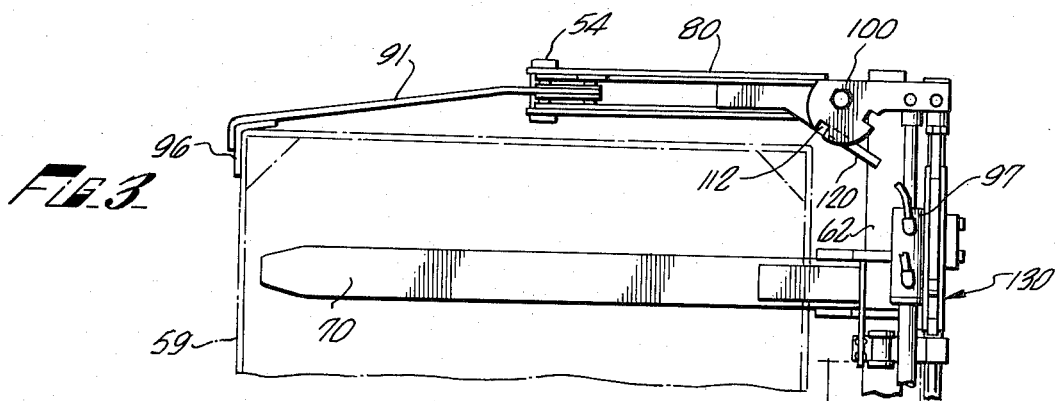
FIG. 3 is a fragmentary top view of the apparatus illustrating in phantom lines the position of a bin container being transported thereon.

Referring now in detail to the drawings and in particular to FIG. 1 of the drawings, the transporting and dumping apparatus, generally designated 10, is illustrated in a bin transporting position. The apparatus 10 includes a frame assembly, generally designated 20, which is adapted to be fixably mounted on the front of a vehicle (not shown), such as a conventional fork lift vehicle, a bin carrying assembly, generally designated 60, which is adapted to support and maintain a bin container during both the transporting thereof and the dumping of the contents therein, and a lock assembly, generally designated 130, which is adapted to insure proper cooperation of the various mechanical elements of the apparatus 10 during the operation thereof.

Figure 5:
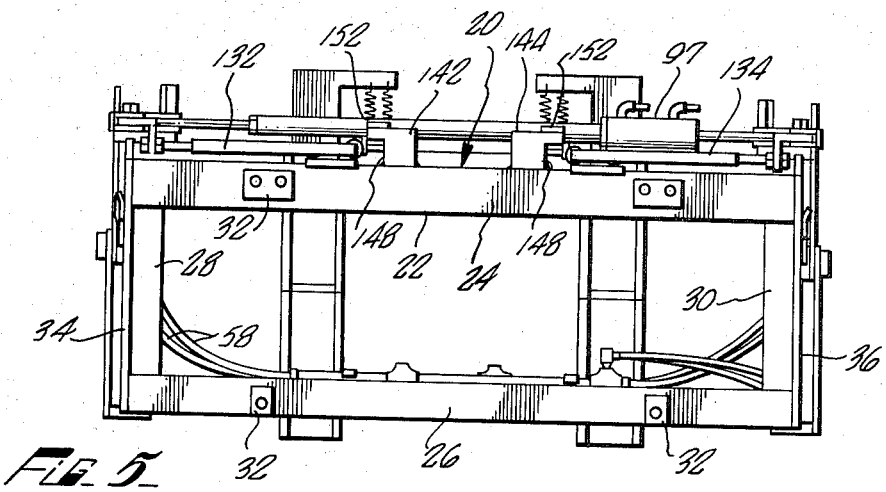
FIG. 5 is a back view of the apparatus illustrating the lock assembly when the bin carrying assembly is movable to a bin dumping position.

The frame assembly 20, as seen best in FIG. 5, includes a rigid, rectangular frame 22 comprising an upper horizontal beam 24, a lower horizontal beam 26, and side columns 28 and 30, respectively. The upper and lower horizontal beams 24 and 26 each include mounting brackets 32 which are adapted to mount the frame 22 on the front of a vehicle (not shown). Adjacent the side columns 28 and 30 are side plates 34 and 36, respectively, each with a guide tab 37 thereon for positioning the bin carrying assembly 60 when it is lowered to the downward bin transporting position adjacent the frame 22 as seen best in FIG. 1. The side plates 34 and 36 also include at the forward end thereof vertical axles 38 and 40, respectively. Pivotally attached to these axles are movable side support members 42 and 44, respectively. Each side support member is identical except for a reversal of the positions of the various parts thereof. Therefore the following description although limited to the side support member 42 is applicable entirely to the other side support member 44 and corresponding elements and components of each side support member will be designated by the same reference numeral.

The side support member 42 includes top and bottom collar members 46 and 48 which fit co-axially about the axle 38 and mount the side support member 42 thereto. Connected to the collar member 46 and 48 are parallel sidewalls 50 and 52 which incline upwardly from their secured ends adjacent the axle 38. Extending between the upper corner of the unattached ends of the sides 50 and 52 is a horizontal axle member 54. As seen best in FIG. 7, first power means comprising a hydraulic cylinder 55 is positioned between the sides 50 and 52 and attached at one end at 56 and serviced by hoses 57 and 58.

Figure 4:
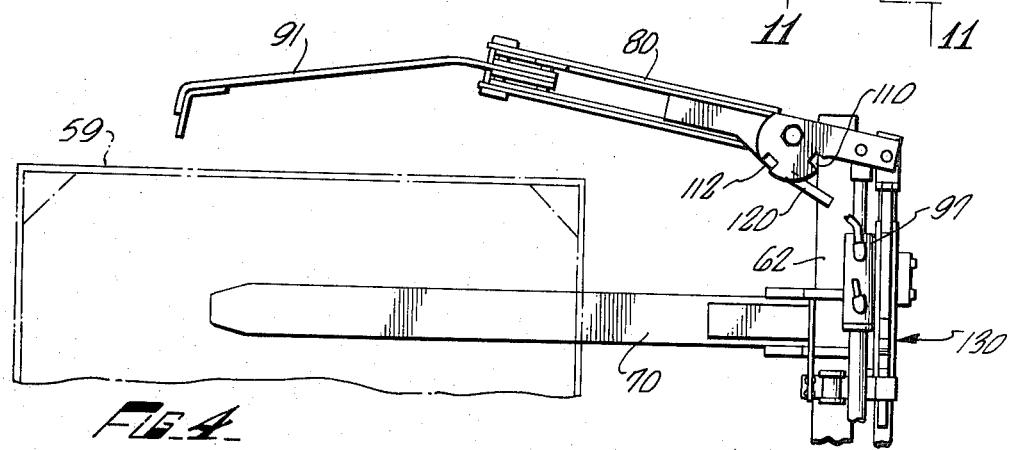
FIG. 4 is a fragmentary top view of the apparatus illustrating in phantom lines a bin container being loaded thereon or unloaded therefrom.

A container bin, as indicated by the phantom lines 59 of FIGS. 3, 4 and 7, when loaded onto the apparatus 10 is received and supported by the bin carrying assembly 60. The bin carrying assembly 60 includes a main support beam 62 in the form of a rigid, horizontally extending cylindrical bar and fork supports 64 and 66 rigidly secured to the cylindrical support beam 62 inwardly from the ends thereof. The fork supports 64 and 66 extend downwardly from the main support beam 62 and rigidly support parallel forks 68 and 70, respectively. The forks 68 and 70 extend from the lower ends of the fork supports 64 and 66 in a generally perpendicular direction with respect thereto. Thus, when the bin carrying assembly is in the transporting position, as seen best in FIG. 1, the fork supports 64 and 66 are substantially vertical and the forks 68 and 70 project forwardly therefrom in a substantially horizontal direction. In this position the forks 68 and 70 support a container bin 59 loaded thereon in an upright position and elevated above ground level.

Side axle members 72 and 74 are rigidly secured to each end of the main support beam 62 and include axles which are substantially perpendicular to the main support beam 62. The axle 76 for axle member 74 is shown in detail in FIG. 10 and it should be recognized that the axle (not shown) for axle member 72 is identical to the vertical axle 76. Moreover, as indicated in FIGS. 1, 2, and 11, the axles for axle members 72 and 74 are in co-axial alignment with the vertical axles 38 and 40, respectively, of the frame assembly 20 when the bin carrying assembly 60 is in its normal lowered position resting on the rigid frame 22. Pivotally secured to the axle members 72 and 74 for movement about the axles thereof when these axles are in co-axial alignment with the vertical axles 38 and 40 are side clamping arms 78 and 80, respectively. The side clamping arms 788 and 80 are substantially identical except that side arm 78 is left handed while side arm 80 is right handed. Because of the substantial identity between the side clamping arms and their respective components, only one side arm will be described in detail, and corresponding components of the side clamping arms 78 and 80 wil be designated by the same reference numeral.

Side arm 78 includes upper and lower collar members 82 and 84 which fit co-axially about the ends of the axle of the axle member 72. Parallel side plates 86 and 88 are each attached at one end to the collar members 82 and 84 and are each pivotally connected at the lower corner of the other end to the horizontal axle 54 between the inclined side plates 50 and 52 of the frame assembly 20. This pivotal connection of the side clamping arms 78 and 80 about the axles 54 represents the only permanent connection between the frame assembly 20 and the bin carrying assembly 60. Thus, the entire bin carrying assembly 60 including the forks, when released to do so, is movable with respect to the frame assembly 20 about a horizontal axis as defined by the aligned axles 54. Movement of the bin carrying assembly 60 about the horizontal axis is achieved by the first power means or the hydraulic cylinders 55 which are connected at their other end at 89 to the side clamping arms, as shown in FIG. 7. Extension of the cylinders 55 lifts the rear end of the bin carrying assembly 60 from the frame 22 and inverts a bin container 59 secured thereon as seen in FIG. 7. Subsequent retraction of the cylinders 55 bring the bin carrying assembly 60 back to its downward or transporting position on the frame.

Pivotally secured to the upper corners of the side plates 86 and 88 at 90 of each side clamping arm is a clamping element 91. When locked in a forwardly extending position by a removable lock pin 92, the clamping elements 91 bend at 93 inwardly to their free bin gripping ends 94. Grip elements 96 are secured to the gripping ends 94 and are adapted to extend around a front corner edge of the bin 59, as illustrated by FIG. 3, when the side clamping arms are closed to a clamping position. The clamping elements 91 are relatively resilient thereby providing a spring force which acts on the bin 59 when the clamping arms are moved to the clamping position.

As indicated previously, each side clamping arm together with its clamping element and the side support attached thereto are movable about a vertical axis defined by a vertical axle 38 and a co-axially aligned axle of an axle member. Movement of the side supports and side arms about the vertical axes is achieved by a second power means or hydraulic cylinder 97 operably connected thereto in a manner hereafter described.

Connector elements 98 and 100, as seen best in FIGS. 8 through 10, are releasably joined to the side clamping arms 78 and 80, respectively, and form a rearward extension of the side clamping arms beyond the vertical axis about which the arms pivot. The connector elements 98 and 100, each comprise a pair of parallel connector plates 102 and 104 co-axially mounted about the axle of the axle member for pivotal movement thereabouts, with a spacer member 106 separating the plates. The connector plates 102 and 104 include aligned slot openings 108 and 110 spaced 90° apart which are adapted to receive a connecting pin 112 pivotally mounted at 114 within a slot 116 of the upper collar member 82 of the side arm. The side clamping arms are each free to move relative to the connector element when the connecting pin 112 associated therewith is pivoted about its axis 114 to a flat position as shown in FIG. 10. When the slot 116 is in alignment with the slots 108 of a connector element, the pin 112 can be pivoted to an upright position into the slots 108 to join a side clamping arm to the respective connector element for movement therewith between an open position for loading and unloading a container bin 59 and a clamping position securing the bin loaded thereon. Similarly, when the slot 116 of the upper collar member 82 is in alignment with the slots 110, the pin 112 can be pivoted to an upright position to lock a side arm to the respective connector element in a folded position substantially parallel to the horizontal main support beam 62.

Spring members 118 each secured at one end to the lower collar member 84 of an appropriate side clamping arm and at the other end to the pin 112 associated therewith maintain the connecting pins 112 in their upright position within the slots 108 or 110. Moreover, when the pins 112 are received by the slots 108, flange members 120 integrally joined to the main support 62 and projecting forwardly therefrom abut the pins 112 to limit movement of the side clamping arms toward the main support beam 62 to a position angularly spaced at least 90° therefrom. Again, however, it should be noted that movement of the pins 112 to the flat position permits the pins to clear the flange members 120 thereby allowing the side clamping arms to move angularly toward the main support beam 62 to the folded position.

Figure 6:
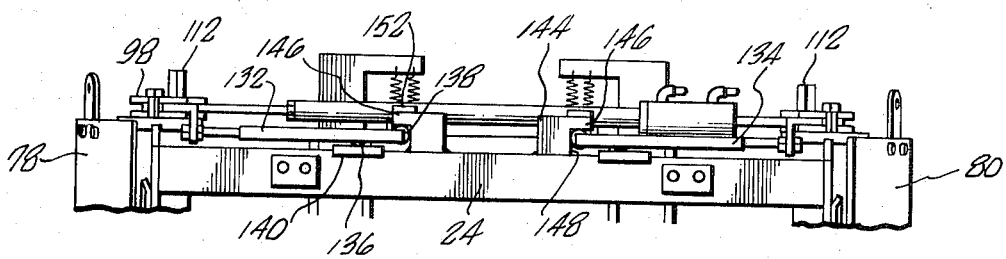
FIG. 6 is a fragmentary back view of the apparatus illustrating the lock assembly during the loading of a bin onto or unloading of a bin from the bin carrying assembly.

Each connector element includes a rearwardly extending arm 122 defined by integral flange extensions of the plates 102 and 104. When the pins 112 are received by the slots 108 to join the side clamping arms to the connector elements, the rearwardly extending arms 122 extend in substantial parallel alignment with the side clamping arms. When the pins 112 are received by the slots 110, the rearwardly extending arms 122 are substantially perpendicular to the folded side clamping arms. The rearwardly extending arms 122 are each pivotally connected to one of the ends of the hydraulic cylinder 97 extending therebetween. The hydraulic cylinder includes a single piston member (not shown) which, when fluid is applied to one side thereof through one of the hoses or conduits 126, moves to one end of the piston cylinder 128 to contract the ends of the hydraulic cylinder 97 or to the other end of the piston cylinder 128 to extend the ends thereof. Contraction of the ends causes the rearwardly extending arms 122 to pivot inwardly about the vertical axes and thereby move the side clamping arms joined thereto with the connecting pins 112 in the slots 108 to the open position as seen in FIGS. 4 and 6. In this open position of the clamping arms, the bin carrying assembly 60 is open to have a bin container loaded thereon or unloaded therefrom without interference from the clamping arms. Extension of the ends of the hydraulic cylinder pivots the rearwardly extending arms 122 outwardly about the vertical axes and causes the side arms joined thereto to move inwardly until the locking pins 112 abut the flange members 120 and the clamping elements securely grip a bin thereon, as seen in FIG. 3.

The lock assembly 130 controls the relative movement of the various components of the apparatus 10 to insure a proper arrangement of these components during each operational step. The lock assembly 130 includes a pair of movable lock elements 132 and 134 which are joined at one end to the rearward arms 122 for movement in a horizontal direction therewith. The lock elements 132 and 134 each include bottom rollers 136 and end rollers 138. The bottom rollers 136 ride on a track 140 secured to the upper horizontal support of the frame assembly 20. The tracks 140 support the movable lock elements 132 and 134 during movement in the horizontal direction. Fixed lock elements 142 and 144 are secured to the upper support 24 of the frame assembly 20 and each includes a horizontally extending over-hanging flange 146 which define keyways 148. The keyways 148 receive the unattached ends of the movable lock elements 132 and 134 when the rearward arms 122 are pivoted by the hydraulic cylinder 97 to open the side arms with the over-hanging flanges 146 preventing movement of the movable lock elements 132 and 134 in a vertical direction. Thus, since the movable lock elements are operably connected to the side clamping arms, this arrangement of the movable lock elements and fixed lock elements form a second connection between the frame assembly and the bin carrying assembly whereby relative movement therebetween about the horizontal axis is prevented until the side clamping arms and side supports have been moved inwardly by the hydraulic cylinders 55 to cause the clamping elements to grip a bin carried thereon.

When the side clamping arms are moved inwardly to this gripping position, the rearwardly extending arms 122 pull the movable lock elements from the keyways 148 past the ends of over-hanging flanges 146 to release the movable lock elements from the fixed lock elements for movement in a vertical direction. Thus, the temporary connection formed by the lock assembly 130 between the frame assembly 20 and the bin carrying assembly 60 is no longer present and the bin carrying assembly 60 is free to move about the horizontal axis to the dumping position as shown in FIG. 7. However, it is important to note that no movement of the bin carrying assembly 60 about this horizontal axis can occur until the bin contained is properly secured by the clamping elements.

Additional lock elements 150, seen best in FIGS. 11 and 12, maintain the side clamping arms in the proper position with the clamping elements gripping the bin when the bin carrying assembly is in the dumping position and during the time the bin carrying assembly is moved thereto. These additional lock elements 150 are pivotally mounted for movement about a horizontal axis 151 to the main support 62 of the bin carrying assembly 60 and include arms 152 which rest on top of the over-hanging flanges when the movable lock elements are within the keyways 148. Removal of the removable lock elements from the keyways 148 and movement of the bin carrying assembly 60 about the horizontal axis free the pivotally mounted lock elements from the over-hanging flanges and permit movement to a locking position adjacent the free ends of the movable lock elements, as shown in FIG. 12, once the movable lock elements clear the ends of the over-hanging flanges. Thus, inward movement of the movable lock elements and outward movement of the clamping arms from the gripping position is precluded during movement of the bin carrying assembly 60 to the dumping position. Springs 154 maintain the additional lock elements 150 in the locking position, but upon return of the bin carrying assembly 60 to the down position the over-hanging flanges release the additional lock elements from the free ends of the movable lock elements. The main support beam 62 is also provided with a pair of forwardly extending permanent flanges 156 whichh extend over the back edge of a bin loaded into the forks to hold the bin when it is inverted.

When it is desirable to use the forks for other operations the pins 112 can be released from the slots 108 to permit movement of the clamping arms and side supports inwardly to a collapsed position adjacent the frame 22 whereupon the pins 112 are inserted into the slots 110 to secure the clamping arms and side supports in this position. Movement of the bin carrying assembly 60 once the clamping arms and side supports are folded is prevented by position of the movable lock elements in the keyways and by the misalignment of the horizontal axles 54.

Thus, the present invention provides a combination transporting-dumping apparatus which securely supports and maintains a large bin container during the operation of the apparatus by positively locking the movable elements thereof in a predetermined arrangement. Moreover, the automated apparatus is provided with a lock assembly which insures proper cooperation of the movable elements and prevents improper operation of the apparatus.

Having fully described my invention, it is to be understood that I do not wish to be limited to the details herein set forth, but my invention is of the full scope of the appended claims.

I claim:

1. An apparatus for handling a container bin, comprising:

frame means adapted to be fixably mounted on a vehicle;

bin carrying means connected to said frame means and movable with respect thereto about a horizontal axis, said bin carrying means including means for supporting a bin in an elevated position above ground level and clamping means movable between an open position for receiving a bin and a clamping position for securely fixing a bin on said support means; and locking means including a first lock element operably connected to said clamping means and movable therewith and a second lock element affixed to said frame means, said first lock element moving to a locking relationship with said second lock element when said clamping means are in said open position to prevent movement of said bin carrying means about said horizontal axis and moving from said locking relationship when said clamping means are in a clamping position to permit movement of said bin carrying means about said horizontal axis, said locking means further acting to limit movement of said clamping means about a vertical axis when said clamping means is in the open position.

2. The apparatus of claim 1, wherein said second lock element defines a keyway which permits movement of said first lock element in one direction and precludes movement in another direction substantially perpendicular to said one direction.

3. The apparatus of claim 2, wherein a third lock element on said bin carrying assembly is provided, said third lock element blocking movement of said first lock element in said one direction when said bin carrying means moves about said horizontal axis.

4. The apparatus of claim 1, wherein first power means are provided to move said bin carrying means about said horizontal axis and second power means are provided to move said clamping means between said open and said clamping positions.

5. An apparatus for handling a container bin, comprising:

frame means adapted to be fixably mounted on a vehicle;

bin carrying means connected to said frame means and movable with respect thereto about a horizontal axis, said bin carrying means including means for supporting a bin in an elevated position above ground level and clamping means movable between an open position for receiving a bin and a clamping position for securely fixing a bin on said support means;

locking means including a first lock element operably connected to said clamping means and movable therewith and a second lock element affixed to said frame means, said first lock element moving to a locking relationship with said second lock element when said clamping means are in said open position to prevent movement of said bin carrying means about said horizontal axis and moving from said locking relationship when said clamping means are in a clamping position to permit movement of said bin carrying means about said horizontal axis; and connector elements releasably joined to said clamping means to limit the movement of said clamping means between said open and clamping positions.

6. The apparatus of claim 5, wherein power means connected to said clamping means through said connector elements move said clamping means between said open and clamping positions.

7. The apparatus of claim 5, wherein means are provided to release said connector elements from said clamping means to permit movement of said clamping means to an inoperative position clear of said bin supporting means.

8. An apparatus for transporting a container bin and dumping the contents thereof, comprising:
a frame assembly including a rigid rear support adapted to be fixably mounted to a bin transporting vehicle and a pair of side supports, each said side support pivotally connected to said rear support for movement about a first vertical axis at one end thereof;
a bin carrying assembly including a rigid rear beam, a pair of side clamping arms, and bin support means rigidly secured to said rear beam between said side clamping arms and adapted to carry a bin in an elevated position above ground level, each said side clamping arm pivotally connected to said rear beam for movement about a second vertical axis and pivotally connected to one of said side supports at said other end thereof for movement about a first horizontal axis, each said first vertical axis being co-axially aligned with one of said second vertical axes to permit movement of each said side clamping arm and said side support connected thereto between an open position for receiving a bin and a clamping position for securing a bin on said support means during the dumping thereof, said first horizontal axes being co-axially aligned when said side clamping arms are moved to said clamping position to permit movement of said bin carrying assembly including said bin support means about said horizontal axes between a bin transporting position and a bin dumping position; and
a lock assembly adapted to lock said bin carrying assembly to said frame assembly in said bin carrying position including movable lock means operably connected to at least one of said side clamping arms and fixed lock means secured to said rear support, said movable lock means being moved from a locking arrangement with said fixed lock means when said side clamping arm connected thereto is moved to said clamping position thereby releasing said bin carrying assembly from said frame assembly for movement about said horizontal axes for the dumping of a bin carried on said support means and secured thereto by said side arms, said locking assembly further acting to limit movement of said clamping arm about a vertical axis when said clamping arm is in the open position.

9. An apparatus for transporting a container bin and dumping the contents thereof, comprising:
a frame assembly including a rigid rear support adapted to be fixably mounted to a bin transporting vehicle and a pair of side supports, each said side support pivotally connected to said rear support for movement about a first vertical axis at one end thereof;
a bin carrying assembly including a rigid rear beam, a pair of side clamping arms, and bin support means rigidly secured to said rear beam between said side clamping arms and adapted to carry a bin in an elevated position above ground level, each said side clamping arm pivotally connected to said ream beam for movement about a second vertical axis and pivotally connected to one of said side supports at said other end thereof for movement about a first horizontal axis, each said first vertical axis being co-axially aligned with one of said second vertical axes to permit movement of each said side clamping arm and said side support connected thereto between an open position for receiving a bin and a clamping position for securing a bin on said support means during the dumping thereof, said first horizontal axes being co-axially aligned when said side clamping arms are moved to said clamping position to permit movement of said bin carrying assembly including said bin support means about said horizontal axes between a bin transporting position and a bin dumping position;

a lock assembly adapted to lock said bin carrying assembly to said frame assembly in said bin carrying position including movable lock means operably connected to at least one of said side clamping arms and fixed lock means secured to said rear support, said movable lock means being moved from a locking arrangement with said fixed lock means when said side clamping arm connected thereto is moved to said clamping position thereby releasing said bin carrying assembly from said frame assembly for movement about said horizontal axes for the dumping of a bin carried on said support means and secured thereto by said side arms;
connector elements movable about said co-axially aligned vertical axis joining said movable lock means to said side clamping arms, said connector elements having means to limit the movement of said side clamping arms.

10. The apparatus of claim 9, wherein power means connected to said connector elements move said clamping arms between said open and said clamping positions.

11. The apparatus of claim 8, wherein pivotal lock means attached to said rigid rear beam of said carrying assembly are provided, said pivotal lock means being movable to a locking arrangement with said movable lock means when side clamping arm connected thereto is moved to said clamping position and said bin carrying assembly is moved about the horizontal axes.

12. In a bin transporting and dumping apparatus including a frame assembly adapted to be fixably mounted on a bin transporting vehicle and a bin carrying assembly pivotally connected to said frame assembly for movement about a horizontal axis between a bin transporting position, said bin carrying assembly including rigid fork means adapted to support a bin above ground level and clamping arms adapted to secure a bin supported on said fork means, each said clamping arm pivotally connected to said bin carrying assembly for movement between an open position for receiving a bin and a clamping position for securing a bin during the dumping thereof, wherein the improvement comprises:
a lock assembly adapted to lock said bin carrying assembly to said frame assembly and thereby prevent movement of said bin carrying assembly about said horizontal axis when in the bin transporting position, said lock assembly including first lock means on said frame assembly and second lock means on said bin carrying assembly, said second lock means pivotally linked to at least one of said clamping arms for movement therewith to a position free of said first lock means when said clamping arms reach the clamping position thereby releasing said bin carrying assembly from said frame assembly for movement about said horizontal axis to the bin dumping position.

13. The apparatus of claim 12, wherein said lock assembly includes third lock means to lock said clamping arms in the clamping position when said bin carrying assembly is released from said frame assembly, said third lock means being mounted on said bin carrying assembly and movable to an operative position holding said second lock means when said second lock means is free of said first lock means and said bin carrying assembly moves about said horizontal axis.

14. An apparatus for handling a container bin, comprising:

frame means adapted to be fixably mounted on a vehicle;

bin carrying means connected to said frame means and movable with respect thereto about a horizontal axis, said bin carrying means including means for supporting a bin in an elevated position above ground level and clamping means movable between an open position for receiving a bin and a clamping position for securely fixing a bin on said support means;

locking means including a first lock element operably connected to said clamping means and movable therewith and a second lock element affixed to said frame means, said first lock element moving to a locking relationship with said second lock element when said clamping means are in said open position to prevent movement of said bin carrying means about said horizontal axis and moving from said locking relationship when said clamping means are in a clamping position to permit movement of said bin carrying means about said horizontal axis; and a third lock element on said bin carrying means, said third lock element moving to a locking relationship with said first lock element when said bin carrying means moves about said horizontal axis to prevent movement of said clamping means from said clamping position.

15. The apparatus of claim 14, wherein said lock element moves said third lock element to an inoperative position when said bin carrying means is moved to the bin carrying position.

* * * * *